United States Patent [19]
Takeuchi

[11] 3,895,601

[45] July 22, 1975

[54] APPARATUS FOR APPLYING WAX TO THE SURFACES OF VEHICLES

[75] Inventor: Shiegeo Takeuchi, Nagoya, Japan

[73] Assignee: Takeuchi Tekko Kabushiki Kaisha, Nagoya, Japan

[22] Filed: Aug. 1, 1973

[21] Appl. No.: 384,735

[30] Foreign Application Priority Data
Dec. 1, 1972 Japan.............................. 47-137570

[52] U.S. Cl................................... 118/8; 118/301
[51] Int. Cl............................................. B05c 5/00
[58] Field of Search............ 118/2, 8, 323, 73, 301; 134/45, 123

[56] References Cited
UNITED STATES PATENTS 3,255,037  6/1966  Knight et al........................ 118/2 X
3,724,415  4/1973  Knight................................... 118/2

*Primary Examiner*—Dorsey Newton
*Attorney, Agent, or Firm*—Waters, Schwartz & Nissen

[57] ABSTRACT

Contamination of the side windows during wax application to the roof of a vehicle can now be effectively prevented irrespective of the size of the vehicle by the provision of guide rail means arranged to guide the wheels of the vehicle on one side thereof and two wax deflector pans respectively having a fixed and an adjustable operative position to cover the respective sides of the vehicle being guided.

1 Claim, 2 Drawing Figures

APPARATUS FOR APPLYING WAX TO THE SURFACES OF VEHICLES

BACKGROUND AND SUMMARY OF THE INVENTION

This invention relates generally to apparatus for applying wax to the upper surfaces of freshly washed and dried vehicles during movement thereof in preparation for polishing operation and is intended to provide such apparatus with means for preventing wax application to the side windows of the vehicles.

With wax applying apparatus of the kind described, which include wax ejector means adapted to pass over an advancing vehicle along the top profile thereof to serve the purpose of applying wax to the bonnet, roof and rear boot surfaces of the vehicle, it is desirable to arrange so that wax is applied to the vehicle all over the upper surfaces thereof irrespective of the vehicle size. Such arrangement, however, has involved a disadvantage that, in the usual case of a vehicle having a roof smaller in width than the bonnet and rear boot thereof, some wax is inevitably applied to the side windows of the vehicle during the period of wax application to the roof surface thereof.

In view of the above, the present invention has for its object the provision of an apparatus of the kind described which is not only adapted to apply wax to the top surfaces of a vehicle in a uniform manner but also is provided with means for effectively preventing wax application to the side windows of the vehicle irrespective of the size thereof.

Another object of the present invention is to provide an apparatus of the character described which includes such preventive means of simple structure.

These and other objects, features and advantages of the present invention will become apparent from the following description when taken in conjunction with the accompanying drawing.

BRIEF DESCRIPTION OF THE DRAWING

In the drawing, which illustrates one preferred embodiment of the invention and in which.

DESCRIPTION OF THE PREFERRED EMBODIMENT

Figure 1:
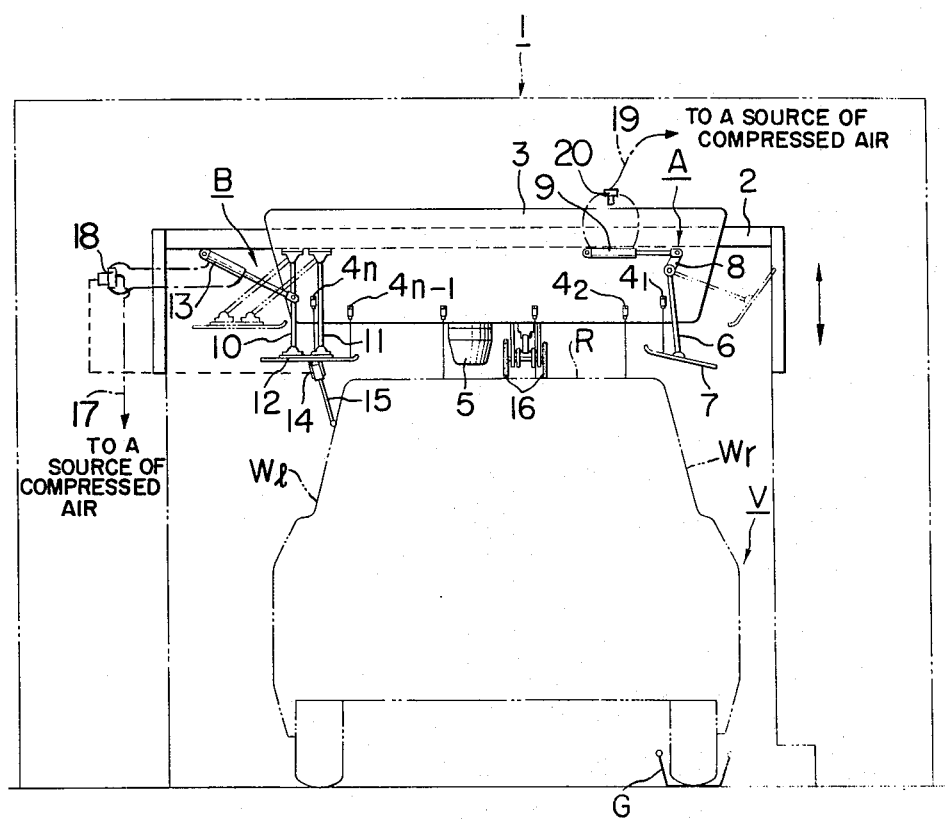
FIG. 1 is a front elevation of the embodiment and
FIG. 2 is an oblique view of same.

Referring to the drawing, reference numeral 1 indicates a portal structure of the apparatus illustrated, which is formed to allow a vehicle to progress therethrough with a wheel way or guide rail G laid on the ground in a position offset from the medial plane of the structure to guide the vehicle therethrough. Reference character V indicates a freshly washed and dried vehicle progressing through the structure 1 under the guide of the wheel way G. Reference numeral 2 indicates a vertically movable frame including a horizontal elongate body and two side legs depending from the opposite ends thereof and supported by the portal structure 1 on the opposite sides thereof to transversely span the advancing vehicle V and for rising and falling movement relative thereto under control of appropriate means, not shown, provided for the purpose.

Secured to the horizontal body portion of the vertically movable frame 2 is a support frame 3 on which a plurality of wax guns 4 ($4_1, 4_2, \ldots 4_n$) are arranged in laterally spaced relation to each other with their respective nozzle orifices directed vertically downward. Supported by the support plate 3 on the underside thereof is a proximity switch 5 which is sensible to the surface of a vehicle coming in proximity thereto and is operably associated with the wax ejecting system including wax guns 4 in a manner so that all the wax guns are started to eject wax at the instant when the switch 5 senses the vehicle surface.

Reference character A generally indicates means for preventing wax application to the adjacent side windows of advancing vehicle V and arranged on the support plate 3 on its side adjacent to the guide rail G. The means A is adapted to extend downward to a predetermined operative position irrespective of the size of the advancing vehicle. Further, means for preventing wax application to the opposite side windows of the vehicle is provided on the support plate 3 on its side remote from the guide rail G, as generally indicated by reference character B, and is adapted to assume an extended position adjustable in accordance with the size of vehicle V.

Figure 2:
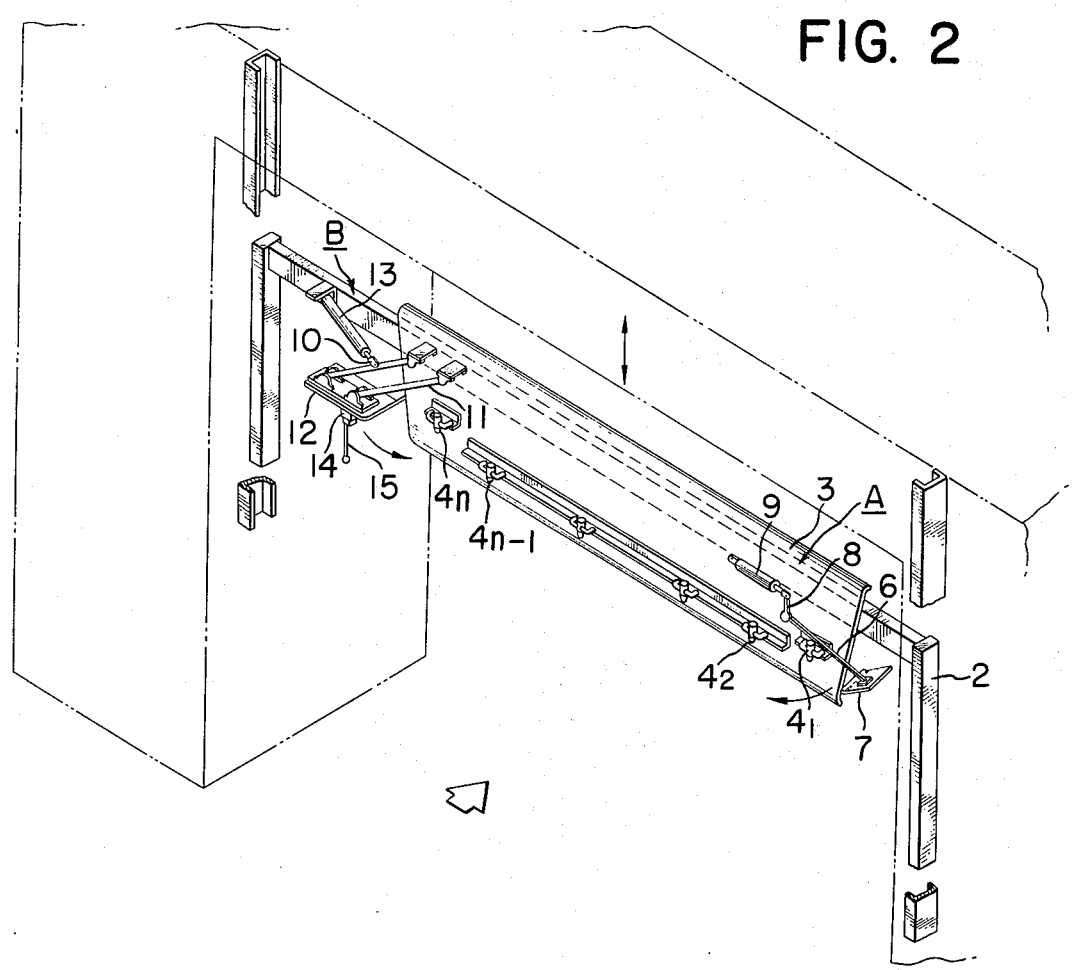

Description will first be made of the wax application preventing means A, which includes a support rod 6 pivoted at the top end to the support plate 3 for rocking movement relative thereto and carrying at the bottom end a wax-receiving pan 7 which extends substantially horizontally, as shown in FIG. 1. The support rod 6 is formed integral with a crank arm 8 which is pivotally connected at the distal end with the actuator rod of a pneumatic or other actuator assembly 9. With this arrangement, it will be readily understood that the support rod 6 is rockable right and left under control of the assembly 9. Namely, when the actuator rod of assembly 9 is extended, the support rod 6 is rocked to the left to place the wax-receiving pan 7 in its downwardly extended operative position lying above the path of right-hand side windows Wr of advancing vehicle V, as shown in FIG. 1, and, when the actuator rod is retracted, the support rod 6 is rocked to the right to raise the wax-receiving pan 7 to its upper inoperative position, as shown in FIG. 2. As will readily be observed, the wax-receiving pan 7 in its lower, operative position serves effectively to intercept wax as ejected through the adjacent rightmost one of the wax guns, $4_1$, allowing such wax to run over the pan downwardly to the outside of vehicle V clearing the right-hand side windows thereof.

Another wax application preventing means B is constructed with a pair of parallel links 10, 11 pivoted at the top to the vertically movable frame 2 for lateral rocking movement and co-operating at the bottom to support a wax-receiving pan 12 in a substantially horizontal position. Reference numeral 13 indicates a pneumatic or other actuator assembly which is pivotally secured at the base end to the movable frame 2 and includes an actuator rod pivoted at the distal end to one of the parallel links, 10, intermediate the ends thereof. With this arrangement, it will be readily understood that the parallel links 10 and 11 are rockable right and left under control of the assembly 13 to swing the wax-receiving pan 12 between its lower, operative and upper, inoperative positions. As observed in FIG. 1, the wax-receiving pan 12 in its lower, operative position lies immediately above the path of the left-hand side windows Wl of the vehicle V, being adjustable right and left, as will be described below in detail. Provided on the underside of wax-receiving pan 12 is a sensor 14, for example, in the form of a limit switch which includes a sensing rod 15 inclined downwardly inwardly. The pneumatic actuator assembly 13 is connected to a source of compressed air through air feed lines 17, and a first control valve 18 such as a three-way valve 18. The valve is operably associated with the sensor 14 so that it is operated to change the flow direction of compressed air to retract the assembly 13 when the sensing rod 15 of the sensor 14 comes in contact with the left side vehicle upper surface including left side windows Wl of the vehicle V, and to extend the assembly 13 when the sensing rod 15 is left apart from the vehicle surface. The first control valve can also be operated by an operator's manual operation of an electric switch (not shown) electrically associated therewith. On the other hand, the pneumatic actuator assembly 9 is connected to the source of compressed air through air feed lines 19 and a second control valve such as a three-way valve 20. This latter valve is electrically associated with the electric switch so that, when the latter is switched on, it is operated to change the flow direction of compressed air to extend the assembly 9, and to retract it when switched off. Such arrangements of the actuator assembly 9, 13, and the first and second control valves are disclosed, for example in U.S. Pat. No. 3,783,465 to the same applicant.

A guide wheel assembly is provided on the support plate 3 to serve the purpose of maintaining a predetermined distance between the proximity switch 5 and the top surfaces of vehicle V and, as shown in FIG. 1, includes a pair of guide wheels 16 for rolling contact with the vehicle.

Description will next be made of the operation of the apparatus embodying the present invention.

As a vehicle V is advanced through the portal structure 1 of the apparatus along the guide rail G, the guide wheels 16 are first placed in rolling contact with the bonnet of the vehicle to cause the proximity switch 5 to operate so that wax is ejected through all the wax guns 4 ($4_1, 4_2, \ldots 4_n$) and applied to the bonnet surface. Subsequently, when the wax guns 4 reach the roof R of vehicle V, an operator of the apparatus switches on the aforesaid electric switch (not shown) and then the aforesaid first and second control valves are thereby operated to change the flow direction of compressed air to cause the actuator assemblies 9 and 13 to extend. Accordingly, the right and left wax-receiving pans 7 and 12 are each lowered from the stored position indicated in FIG. 1 by the dotted lines to the extended operative position indicated in FIG. 1 by the solid lines. It is to be noted that the operative position of the right-hand side pan 7 is at all times fixed so that wax being ejected through the rightmost one of wax guns, $4_1$, is received by the pan 7 to flow down to the outside of the vehicle V, never impinging against the right-hand side windows Wr thereof. This is due to the fact that the vehicle is being guided by the wheel way G and the right-hand side windows Wr thereof take a definite path at all times substantially the same irrespective of the vehicle size. Incidentally, the extended, operative position of the right-hand side pan 7 can be adjusted by varying the extent to which the actuator rod of assembly 9 is extended.

On the other hand, in the case of left-hand side wax application preventing means B, the operative position of wax-receiving pan 12 thereof is automatically adjustable to the right or left so as to lie at all times immediately above the path of left-hand side windows Wl of the advancing vehicle irrespective of the size thereof under control of the sensor 14, which operates the actuator assembly 13 in opposite directions as the sensing rod 15 comes in and out of contact with the left-hand side surface of the vehicle. In other words, the sensor 14 operates to cause the actuator assembly 13 to retract and extend as the sensing rod 15 repeatedly makes and breaks contact with the left-hand side surface of the advancing vehicle in such a manner that the wax-receiving pan 12 is always held immediately above the path of left-hand side windows Wl to receive wax being ejected through the leftmost wax guns $4_n$ and $4_{n-1}$, allowing such wax to flow down only to the outside of the vehicle body.

As the vehicle progressing continuously comes to a point where the rear boot thereof reaches the row of wax guns 4, the operator switches off the electric switch (not shown) to operate the first and second control valves to change the flow direction of compressed air so that both actuator assemblies are caused to retract to swing the respective wax-receiving pans 7 and 12 upwardly into their inoperative positions indicated in FIG. 1 by the dotted lines so that the rear boot, which is usually larger in width than the roof, can be coated with wax being continuously ejected through all the wax guns 4 ($4_1, 4_2, \ldots 4_n$).

To summarize, the apparatus of the present invention is provided, among others, with means A and B for preventing wax application to the side windows of vehicles, which are arranged on the vertically movable frame 2 on its opposite sides adjacent to the guide rail G and remote therefrom and include respective wax-receiving pans 7 and 12 adapted to receive wax as ejected through the respective endmost wax guns $4_1$ and $4_n - 4_{n-1}$ and direct such wax to the outside of the advancing vehicle clear of the side windows thereof. In addition, the wax-receiving pan 12 of the means B provided on the side remote from the guide rail G is automatically adjusted so as to be held at all times immediately above the side windows of the vehicle on the same side irrespective of their lateral position variable with the vehicle size. It will be appreciated that with such arrangement application of any wax to the side windows of a vehicle can be effectively prevented on either side thereof irrespective of the size of the vehicle and in this manner all the side windows thereof can be kept from any contamination with wax whereas not only the roof but also the bonnet and rear boot of the vehicle, which are usually larger in width than the roof, can be uniformly coated with wax all over the surfaces thereof.

While one embodiment of the present invention has been shown and described, it is obvious to those skilled in the art that various changes and modifications may be made therein without departing from the spirit and scope of the claimed invention.

What is claimed is:

1. Apparatus for applying wax to the upper surfaces of vehicles during movement thereof, comprising: a portal structure through which a vehicle can pass; a guide rail in a position offset from the medial plane of said portal structure to guide the vehicle therethrough; a frame vertically movably mounted on said portal structure; a plurality of wax guns arranged on said frame in laterally spaced relation to each other; a first wax receiving pan swingably supported by said frame on its side adjacent to said guide rail; first actuator means connected to said first wax-receiving pans so as to swing said first wax-receiving pan between an inoperative position and an operative position to intercept wax as ejected through the most adjacent one of said wax guns; a second wax-receiving pan swingably supported by said frame on its side remote from said guide rail, second actuator means operable to swing said second wax-receiving pan between an inoperative position and an operative position to intercept wax as ejected through at least one of said wax guns most adjacent thereto; and sensor means arranged on said second wax-receiving pan for sensing the adjacent side surface of the vehicle and operably associated with said second actuator means to adjust the operative position of said second wax-receiving pan to the size of the vehicle.

* * * * *